United States Patent [19]

Ooki

[11] Patent Number: 5,636,201
[45] Date of Patent: Jun. 3, 1997

[54] OPTICAL DISK MEMORY FOR RECORDING REPRODUCIBLE INFORMATION

[75] Inventor: Hiroshi Ooki, Yokohama, Japan

[73] Assignee: Nikon Corporation, Japan

[21] Appl. No.: 558,999

[22] Filed: Nov. 16, 1995

[30] Foreign Application Priority Data

Nov. 21, 1994 [JP] Japan .................... 6-286214

[51] Int. Cl.$^6$ .................................... G11B 7/00
[52] U.S. Cl. .................... 369/275.4; 369/275.1
[58] Field of Search ............. 369/13, 275.1–275.5

[56] References Cited

U.S. PATENT DOCUMENTS

| | | | |
|---|---|---|---|
| 5,187,703 | 2/1993 | Katayama e al. | 369/275.1 |
| 5,272,684 | 12/1993 | Takeuchi et al. | 369/13 |
| 5,341,349 | 8/1994 | Kagami et al. | 369/275.2 |
| 5,357,494 | 10/1994 | Aratani | 369/13 |
| 5,368,986 | 11/1994 | Terao et al. | 369/275.1 |
| 5,410,534 | 4/1995 | Nagata et al. | 369/275.2 |
| 5,430,706 | 7/1995 | Utsunomiya et al. | 369/275.1 |
| 5,479,382 | 12/1995 | Nishida et al. | 369/275.1 |

OTHER PUBLICATIONS

Miyagawa et al., "High Track Density Recording by Land and Groove Method on Phase Change Optical Disks", Technical Digest, Symposium on Optical Memory 1994, Jul. 11–13, 1994, Tokyo, Japan.

Fukumoto et al., "Cross–Talk Analysis of Land/Groove Magneto–Optical Recording", Technical Digest, Symposium on Optical Memory 1994, Jul. 11–13, 1994, Tokyo, Japan.

Primary Examiner—Nabil Hindi
Attorney, Agent, or Firm—Pennie & Edmonds

[57] ABSTRACT

This optical disk comprises neighboring land tracks and a groove track laid therebetween. Light modulating regions are formed in said land tracks and each of the light modulating regions extends in the groove track.

14 Claims, 7 Drawing Sheets

OPTICAL DISK MEMORY FOR RECORDING REPRODUCIBLE INFORMATION

BACKGROUND OF THE INVENTION

1. Field of the Invention

The present invention relates to an information recording medium and, more particularly, to an optical disk memory such as a compact disk (CD), a magneto-optical disk (MO), and the like, from which information can be read out using light.

2. Related Background Art

An optical disk having amplitude-modulated marks is called a phase change type disk (PC disk). Such an optical disk has been practically applied to video image files, document files for business use, and as an external memory for a personal computer. Such an information recording medium is described in U.S. Pat. No. 4,423,502.

SUMMARY OF THE INVENTION

Figure 4:
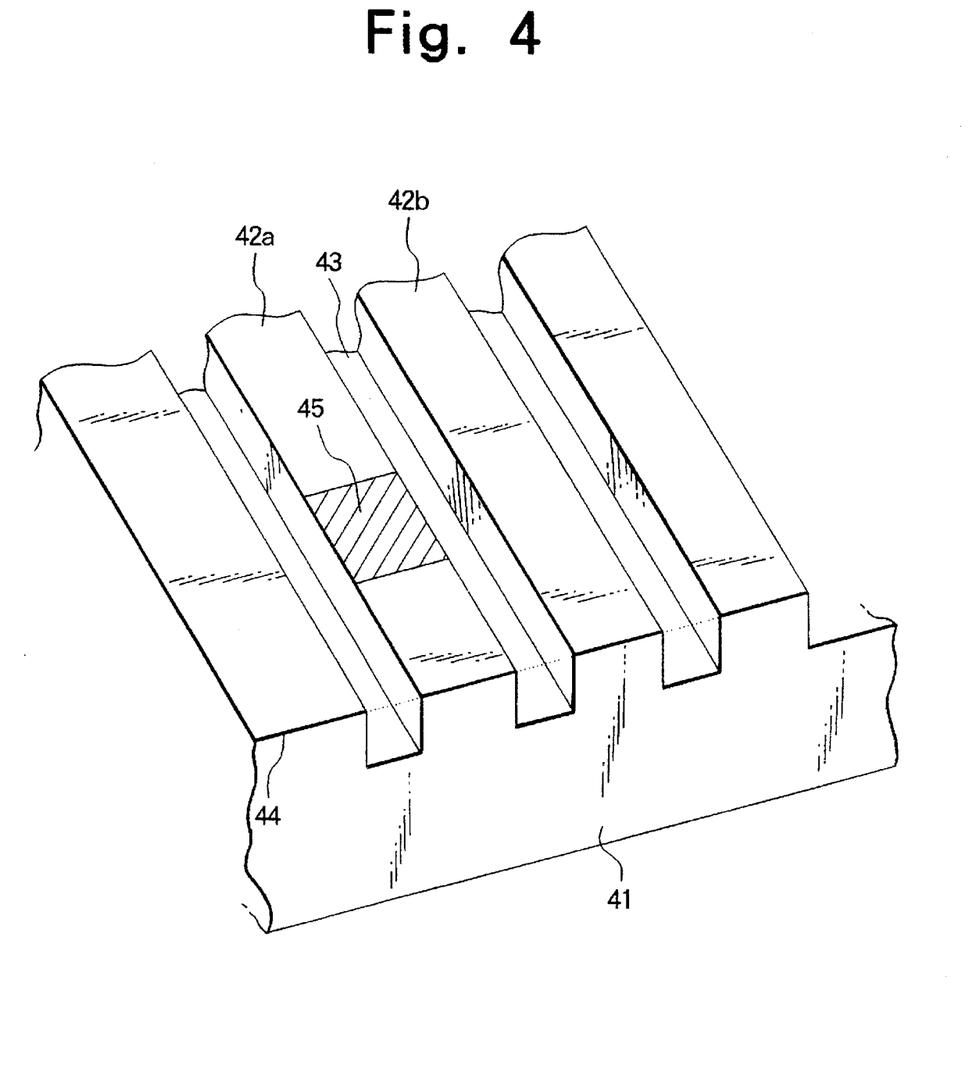
FIG. 4 is a partially cutaway perspective view of an optical disk given for reference and comparison with the optical disk of FIG. 1C.

FIG. 4 shows a part of the structure of a PC disk, as conceptualized by the present inventor, for comparison to the optical disk of the present invention.

As shown in FIG. 4, the PC disk has a 1.2-mm thick transparent substrate 41 having land tracks 42a and 42b thereon, and both of which extend in a same direction. The land tracks (raised tracks) 42a and 42b are separated by a groove track 43 extending in the same direction as the land tracks 42a and 42b. An amplitude-modulating mark (light modulating region) 45, which changes the light reflectance characteristics of the surface, is formed on the transparent substrate 41. Amplitude-modulating mark arrays including mark 45 and other marks (not shown) encode information stored on the tracks.

Digital information recorded on the PC disk is encoded by varying the positions and lengths of the amplitude-modulating marks.

The recorded information can be reproduced by inserting the PC disk into a disk drive. The disk drive rotates the PC disk, and projects a reproduction beam from a reproduction head toward the PC disk. The size of the reproduction beam, i.e., the size of the beam spot incident on the PC disk is substantially the same as that of the amplitude-modulating mark. By detecting the diffraction state of the irradiated light beam after it has been reflected from an information track (land track) on the PC disk, information recorded on the PC disk can be reproduced.

When no amplitude-modulating mark is present on the land track at the position of the beam spot, the light reflectance on the land track is relatively large, thereby the information detector incorporated in the head detects a large value.

When an amplitude-modulating mark is present on the land track at the position of the beam spot, since the light reflectance is relatively small, the information detector incorporated in the head detects a small value.

The light beam emitted by the reproduction head can be focused to the diffraction limit of the light by means of, e.g., a lens. The radius of the beam spot irradiated onto the information track can be set to be 1 μm or less, therefore, considering the limitation of the radius of the beam spot, the interval between the information tracks can be 1.6 μm.

In order to increase the amount of information per unit area that can stored on the PC disk, the interval between the information tracks can be decreased, if the wavelength of a reproduction beam can be shortened in proportion with the decreased interval. However, light sources that emit short wavelength light beam are not always appropriate for the reproducing head of the optical system. Furthermore, if the interval of the information tracks is decreased while the wavelength of the reproduction beam remains the same, i.e., the diameter of the beam spot remains the same, the beam spot is undesirably irradiated onto the signal marks on neighboring tracks, and the reflectivity of the neighboring track may adversely affect the validity of the information reproduced neighboring track.

In an optical disk of the present invention, the disk has neighboring land tracks separated by a groove track laid between the adjacent tracks. Signal marks (light modulating regions) are formed on the land tracks, and extend into the groove tracks on each side of the land track. Thus, two light modulating regions (1st and 2nd light modulating regions) lie on the same optical disk radius and on adjacent land tracks.

When the reproduction light beam is irradiated on the 1st light modulating region, the light component which has the maximum light intensity and is located at the center of the light beam reflected from an area at or near the center of the 1st modulating region. At this time, the neighboring light modulating region (2nd light modulating region) is positioned at the periphery of the light beam centered on the 1st light modulating region, and the light at the periphery of the light beam is reflected by the 2nd light modulating region back to the detector incorporated in the head.

However, because the 2nd light modulating region extends into the groove track, and the phase difference $\psi$ between light components reflected by the central and groove portions of the 2nd light modulating region is an odd number times $\pi$ radians, the light component reflected by the central portion of the 2nd light modulating region is cancelled by the light component reflected from the portion of the 2nd light modulating region positioned in the groove track due to destructive interference. That is, $\psi=(2n-1)\times\pi$, where n is a natural number. In other words, the phase difference between the light components reflected by an light modulating regions lying on the land track and the groove track, respectively, is an odd number times $\pi$ radians.

When the light beam intensity has a Gaussian distribution, and the center of the incident light beam falls on the center of the 1st light modulating region, the light intensity of the light component reflected from the area at and near the center of the 2nd light modulating region is smaller than that of the light component reflected by the light modulating region on the groove track. However, the area of the central portion of the 2nd light modulating region is greater than that of the portion of the 2nd recording region on the groove track, thereby the light components reflected from the 2nd light modulating region can entirely cancel each other.

Consequently, even when the periphery of the light beam spot falls on other light modulating regions lying on neighboring land tracks as a result of decreasing the track interval, the light components reflected by those portions of the other light modulating regions cancel each other out due to the destructive interference.

In addition, taking the symmetric relation between the neighboring light modulating regions into account, when the reproduction head has moved on so that the central portion of the light beam is illuminating the 2nd light modulating region on the 2nd land track, light components reflected by the groove portion and land track portion of the 1st light modulating region cancel each other in the same manner.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1A:
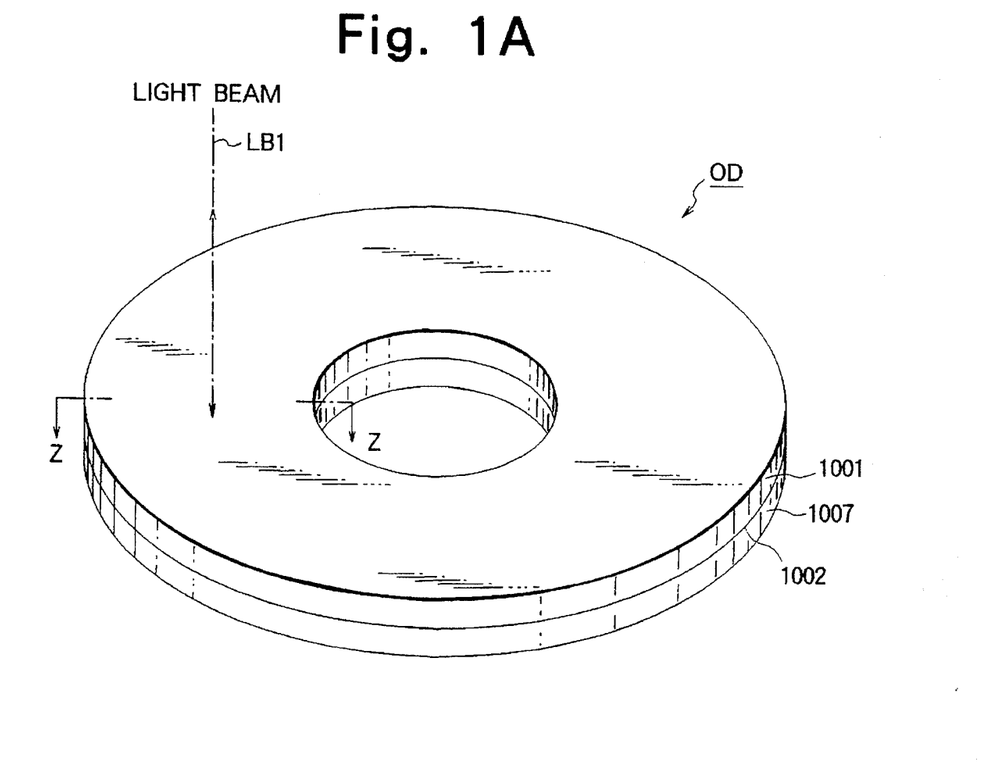
FIG. 1A is a perspective view showing an optical disk according to an embodiment of the present invention.
Figure 1B:
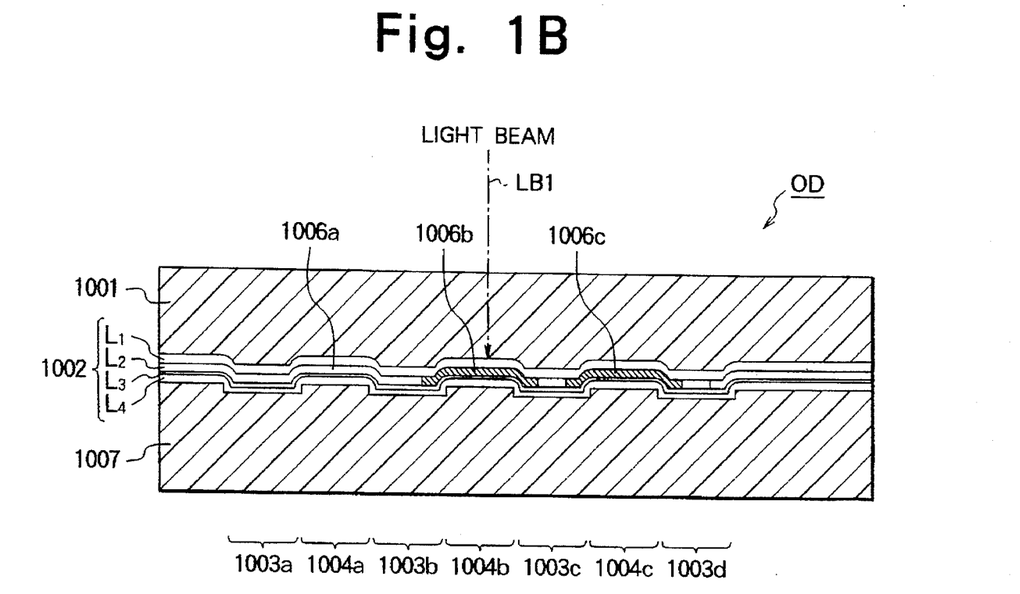
FIG. 1B is a sectional view of the optical disk shown in FIG. 1A taken along arrows Z—Z in FIG. 1A.

FIG. 1A is a perspective view showing a PC optical disk (information recording medium) according to an embodiment; FIG. 1B is a sectional view of the optical disk shown in FIG. 1A.

(Rough Structure)

As shown in FIG. 1B the optical disk OD comprises a substrate 1001, a protection film 1007, and an intensity modulation layer 1002 sandwiched between the substrate 1001 and the protection film 1007.

The intensity modulation layer 1002 comprises a dielectric protection film L1, a signal recording layer L2, a dielectric protection film L3, and a metal reflection film L4. The recording thin film L2 is sandwiched between the upper and lower protection layers L1 and L3, and the reflection layer L4 is further formed on the layer L3. Thus, a four-layered structure is used in this optical disk OD.

Figure 1C:
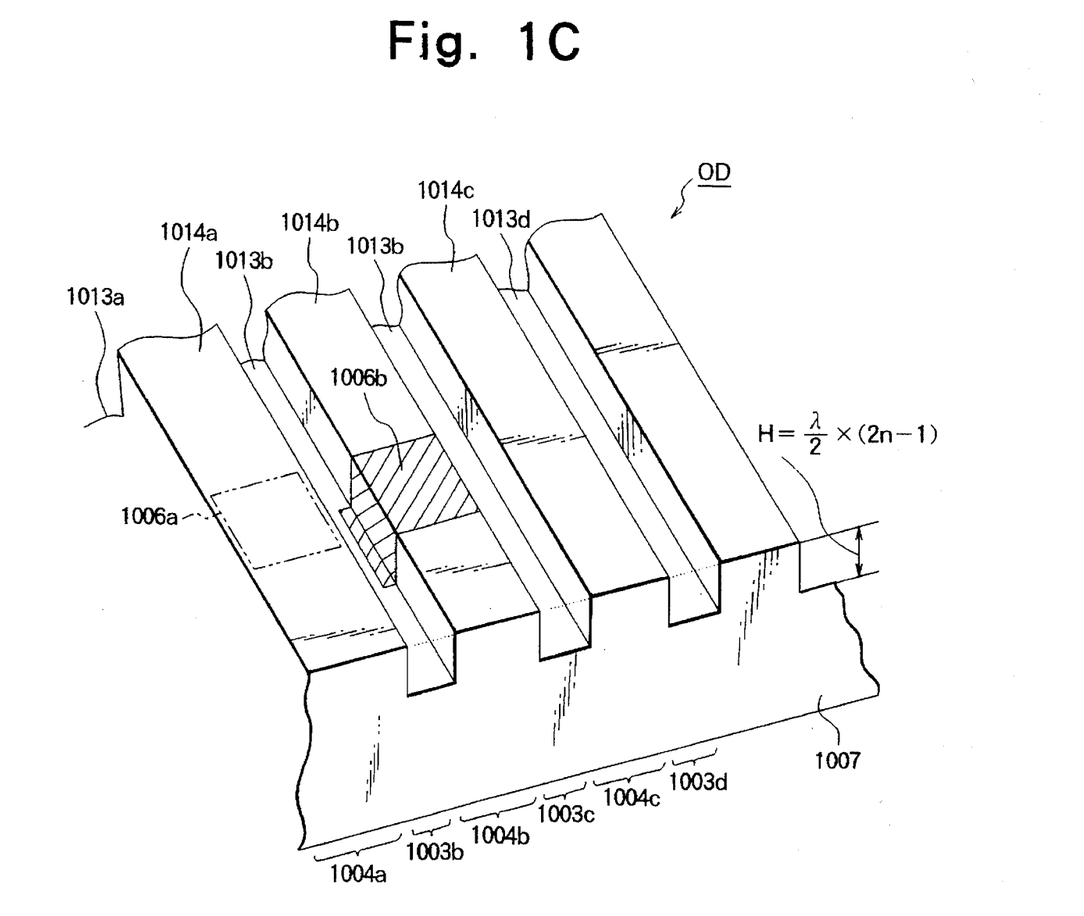
FIG. 1C is a partially cutaway perspective view for explaining the structure of the optical disk of FIG. 1B.

As shown in FIGS. 1B and 1C, the disk OD comprises land tracks (first track group) 1004a to 1004c having flat top surfaces 1014a to 1014c, respectively, and groove tracks (second track group) 1003a to 1003d having flat bottom surfaces 1013a to 1013d, respectively.

(Advantage of Sandwiching)

In this disk OD, the recording thin film L2 on the substrate 1001 becomes an internal surface of the disk OD, thereby preventing the recording thin film L2 from deterioration or damage due to direct exposure to the air. A recording/reproduction laser beam LB1 is not easily affected by dust, scratches, and the like since it is focused on the thin film 1002 through the substrate 1001 and diverges on the outer surface of the substrate 1001.

(Layer Material)

Materials used in layers 1001, 1007 and 1002 (L1 to L4) are explained below.

The substrate 1001 consists of polymeric material such as polycarbonate (PBT). The substrate 1001 may consist of polymethyl methacrylate instead of PBT. The protection film 1007 consists of a polymeric material such as polycarbonate (PBT). The protection film 1007 may consist of polymethyl methacrylate also.

The dielectric protection films L1 and L3 each consist of an organic high-melting point dielectric material such as zinc sulfide (ZnS); however, another dielectric material such as Phospho-Silicate Glass (PSG) or silicon nitride (SiN) is applicable instead of ZnS.

The metal reflection film L4 consists of Al. Au or Ni is applicable as a material for the metal reflection film L4 instead of Al.

The recording layer L2 consists of GeSbTe.

(Phase Change Disk Mechanism)

In the phase change recording according to the present embodiment, information is recorded by causing a phase change (e.g., from an amorphous state to a crystalline state, from one crystalline state to another crystalline state, and the like) of the recording thin film 1002, and the recorded information is reproduced by detecting a change in reflectance of the recording thin film 1002. The phase change recording mechanism is described in more detail below.

As shown in FIG. 1C, when the information is written in the recording layer 1002, more specifically, written in the GeSbTe recording thin film L2, the phase of one region, e.g., 1006b is changed in comparison to the phase of another region, e.g., 1006a. More precisely, the crystal state or structure of the recording layer L2 in this region 1006b is changed from the monocrystalline state to the amorphous state by writing mechanism. The reflectance of the recording layer L2 in the monocrystalline state is typically 30%, and the reflectance of the recording layer L2 in the amorphous state is typically 2 to 3%.

After the information is recorded on the tracks 1004a to 1004c, the information is read out by tracing each of the tracks 1004a to 1004c with laser light beam LB1. Since phases of the portions 1006b to 1006c of the recording layer L2 are changed by writing information therein, components of the light beam LB1 reflected by respective recording portions 1006b and 1006c are modulated and differ from those components of light beam component reflected by remaining portions, e.g., 1006a. The photodetector 35 in the reproduction head detects the reflected light beam and the recorded information is thereby detected and reproduced.

This recording method is reversible in principle since it does not require any shape change, and information can be repetitively rewritten by reversibly causing a phase change by altering the irradiation conditions. Such an optical disk can also be used as a write-once type disk depending on the material used. A material containing a calcogen such as Te, Se, or the like is applicable as a major material for the recording thin film L2.

(Advantage of the GeSbTe Layer)

However, according to this embodiment of the optical disk, $10^5$ or more repetitive overwrite recording operations can be attained using a single laser beam that is modulated between recording power of 22 mW and erasing power of 10 mW at a linear velocity of 22 m/sec, because the film L2 is made of GeSb$_2$Te$_4$ sandwiched between zinc sulfide (ZnS) protection layers L1 and L3, these protection layers L1 and L3 formed on the resin substrate 1001.

(the destructive interference principle)

The optical disk comprises the groove tracks (hollow tracks) 1003a to 1003d and the land tracks (raised tracks) 1004a to 1004c, thereby the surface of the recording layer L2 forms uneven structure. The land tracks 1004a to 1004c and groove tracks 1003a to 1003d are alternatively formed on the substrate 1001.

The land track and the groove track form concentric spirals. The respective land and groove tracks may also form concentric circles. The light modulating regions (amplitude marks) are formed in either the groove tracks or the land tracks and arranged as arcs on concentric circles. The land and groove tracks form a hill and valley structure along the radial direction of the optical disk OD.

Figure 2:
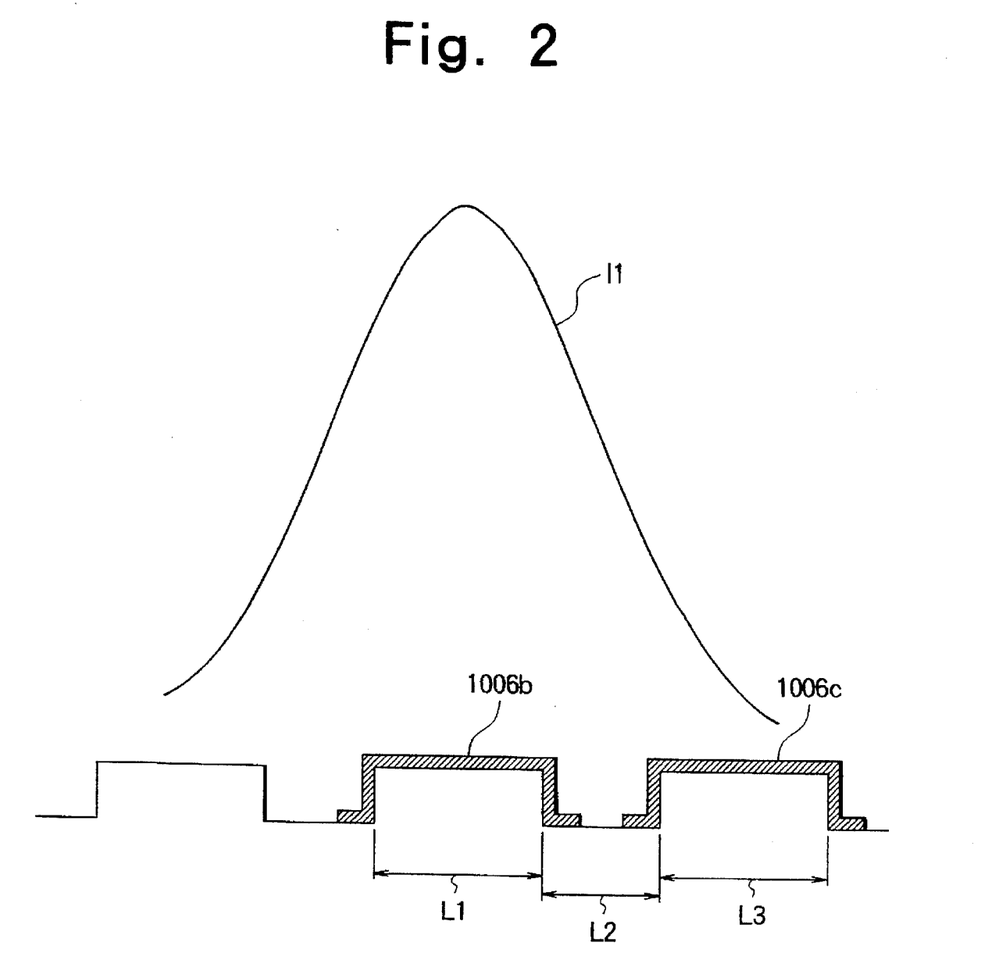
FIG. 2 is a sectional view of the optical disk and a plot of the intensity distribution of light reflected by the light modulating regions, when the reproduction beam is aimed at the center of a 1st light modulating region and the periphery of the beam cross tracks to illuminate a 2nd light modulating region.

Each of the light modulating regions 1006a to 1006c covers the respective land tracks 1004a to 1004c, and extends in the groove tracks 1004a and 1004c laid therebetween, as shown in FIGS. 1B and 1C. In other words, the width L1' of the amplitude modulation mark 1006b formed on land track 1004b is wider than the width L1 of the land track 1004b itself, and the width L3' of the amplitude modulation mark 1006c is wider than the width L3 of the land track 1004c, as shown in FIG. 2. Note that width is measured along a radius of the optical disk OD.

Figure 1D:
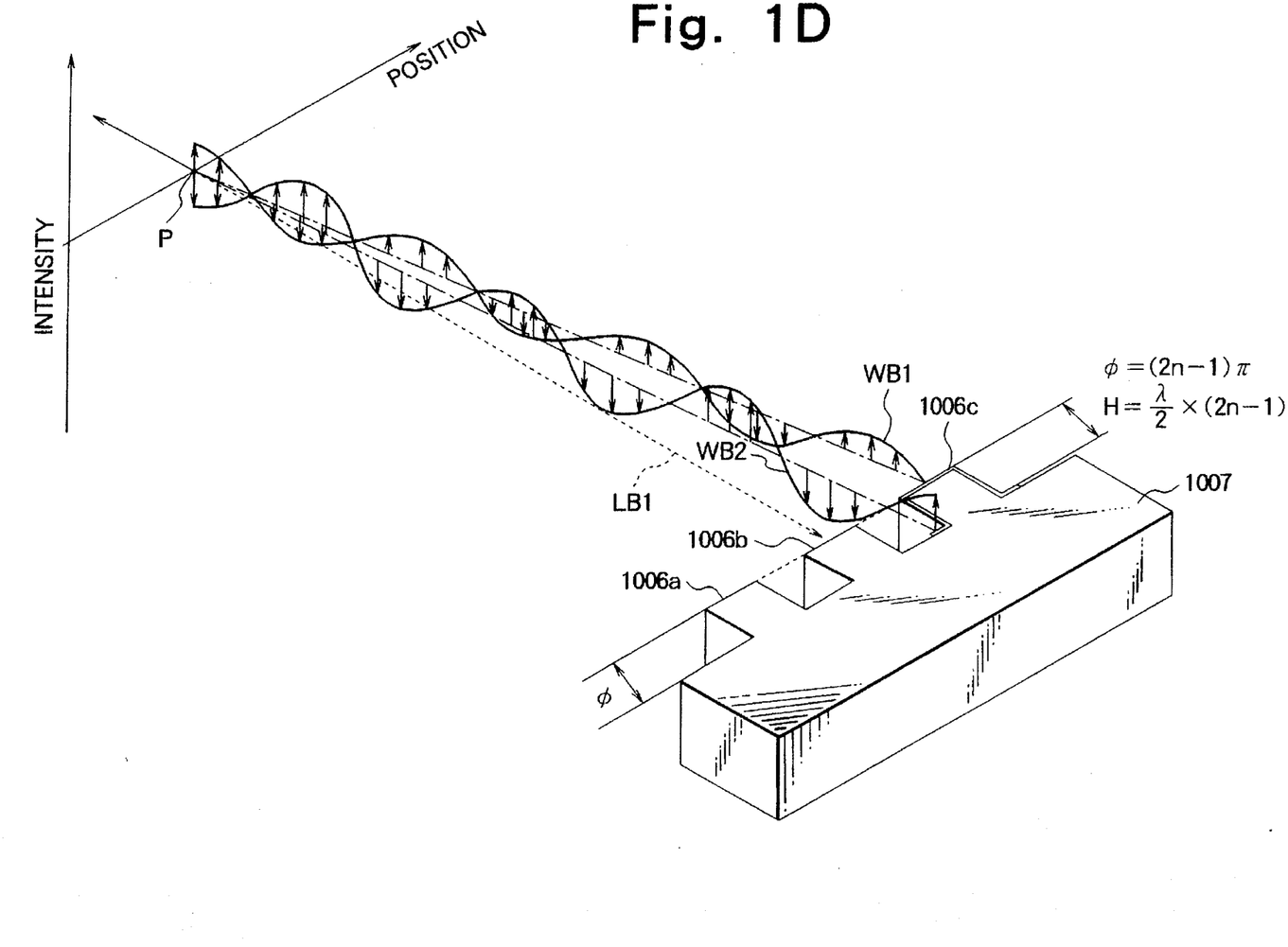
FIG. 1D is a diagram illustrating the principle of the destructive interference of light.
Figure 1E:
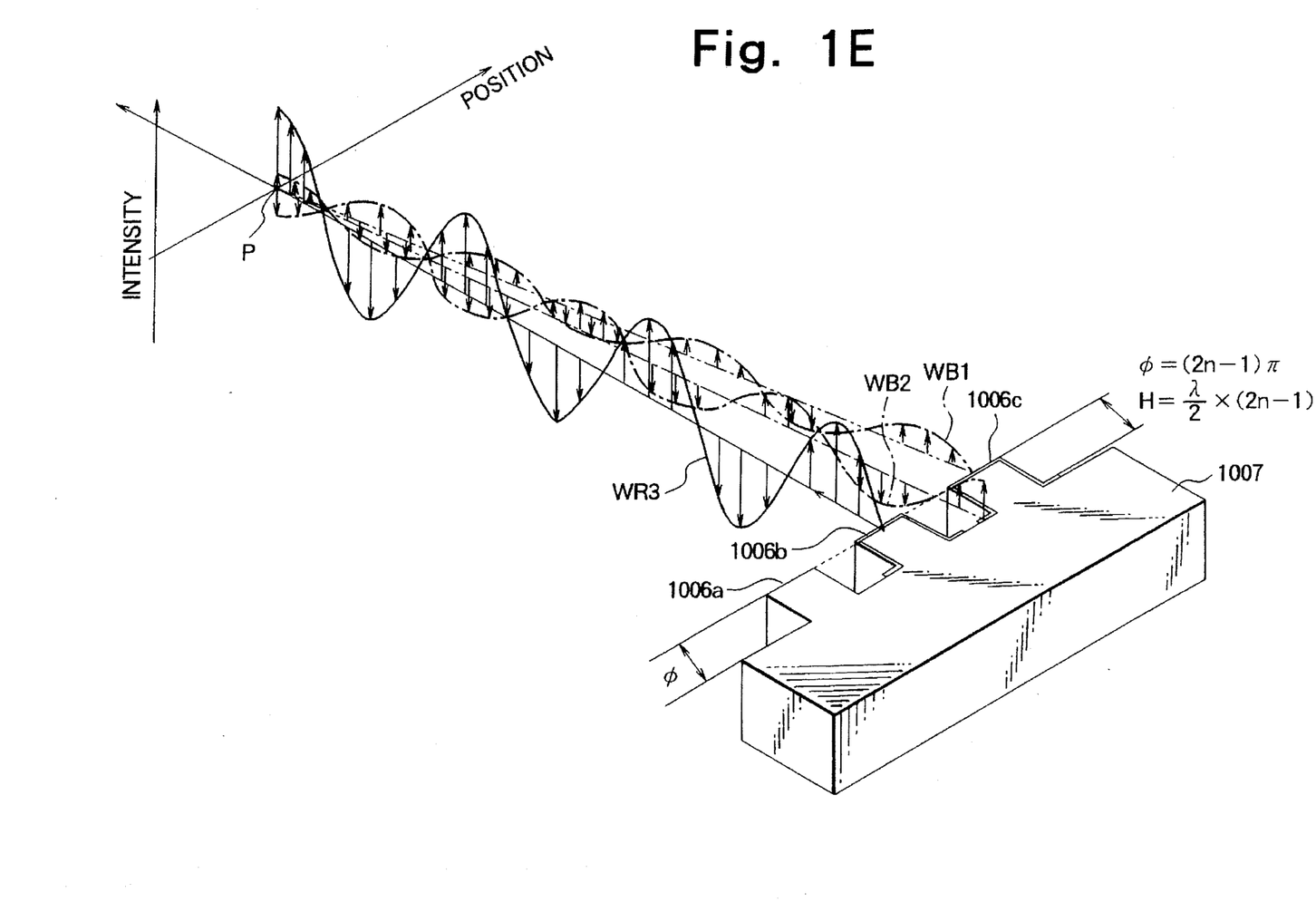
FIG. 1E is a diagram showing the light compensation principle.

The step height H of each land tracks 1004a to 1004c is an odd number times quarter of the wavelength $\lambda$ of light beam to be irradiated on the tracks as shown in FIG. 1C, i.e., H=(2n−1)×$\lambda$/4, (H=1$\lambda$/4, 3$\lambda$/4, 5$\lambda$/4, 7$\lambda$/4. . . ). Consequently, the difference in the optical path length of the light beam components reflected from the top the land track and the groove track is the step height H, which can be expressed by using the phase difference $\psi$ between light beam components respectively reflected by any of the upper surfaces 1014a to 1014c of the land tracks 1004a to 1004c and any of the bottom surfaces 1013a to 1013d of the groove tracks 1003a to 1003d. The phase difference $\psi$ between reflected light components is an odd number times $\pi$ radians as shown in FIGS. 1D and 1E, i.e., the phase difference $\psi$ satisfies the following equation:

$$\psi=(2n-1)\times\pi, (\psi=1\pi, 3\pi, 5\pi, 7\pi...),$$

where n is a natural number.

When the step height H satisfies the above equation, the light components reflected respectively by the land and groove tracks have amplitudes which are opposite in phase to each other. Thus the light components reflected by the land and groove portions of the light modulating region 1006b interfere destructively at the detecting point P as shown in FIG. 1D, when the light beam LB1 is aimed at the object track 1004a. The wavelength $\lambda$ of the light beam is larger than 400 nm and smaller than 900 nm.

The destructive interference principle is explained in more detail below.

Figure 3:
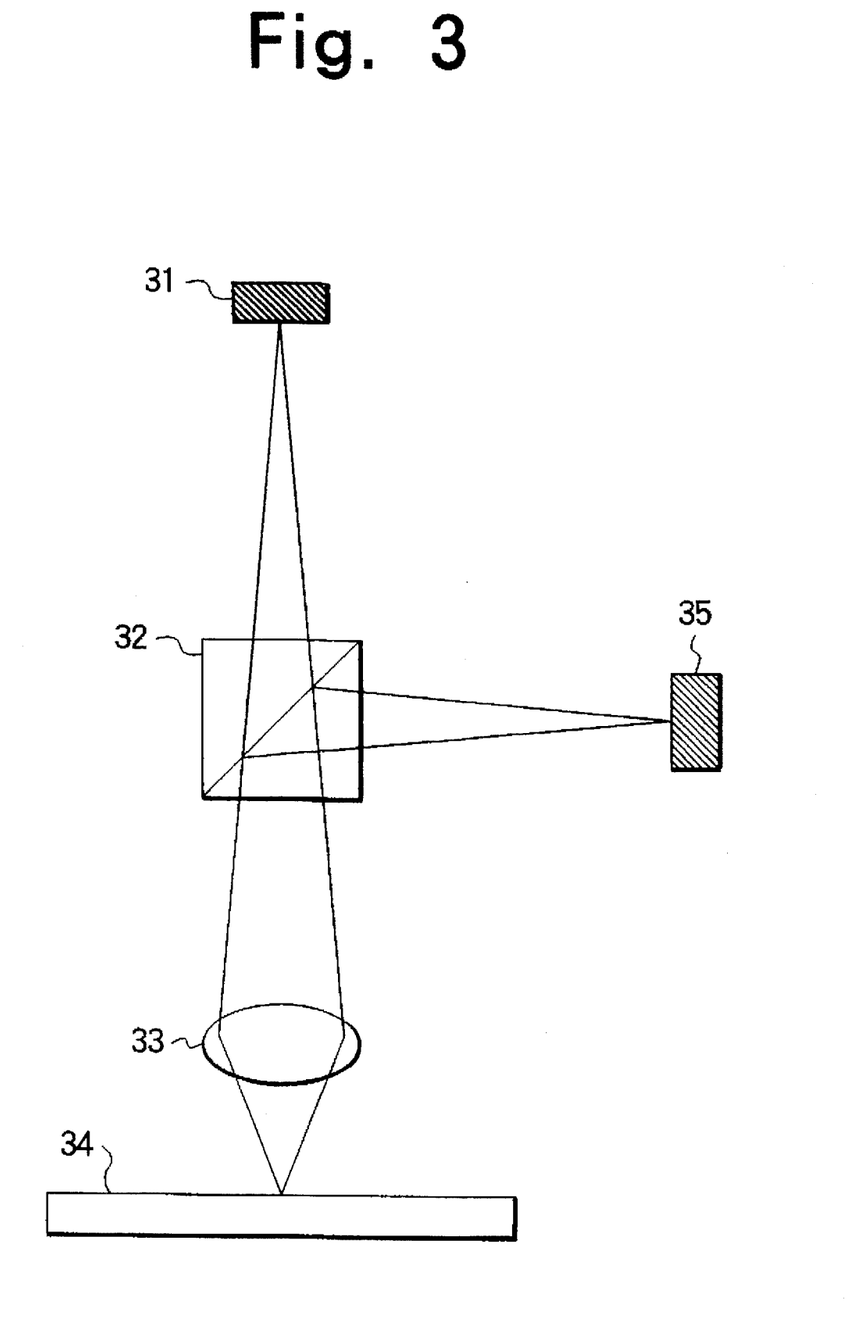
FIG. 3 is a view showing the optical disk shown in FIG. 1A and an optical reproduction system therefor.

FIG. 3 shows the optical disk OD shown in FIG. 1A and an optical system for the disk. The recorded information is reproduced by using this system or other known optical pick-up heads (not shown). Such a system focuses a laser beam on the optical disk OD, forming laser spot that traces the land track on the disk.

When reproducing information stored on the optical disk OD, the light beam is emitted from a light source such as a semiconductor laser diode 31 and is focused onto the surface 34 of the optical disk OD by an objective lens 33. Before reaching the optical disk OD, the light beam passes through a beam splitter (BS) 32; and after reflected by the surface 34 of the information recording medium OD, the light beam passes through the objective lens 33 and is deflected by the beam splitter 32 to a photodetector (photoelectric convertor) such as a photodiode 35. The photodetector 35 is positioned at the point P shown in FIG. 1D. The photodetector 35 detects the incident light and converts it into an electric signal, thereby the recorded information in the optical disk is reproduced by measuring the voltage level of the electric signal output from the photodetector 35.

The incident light beam intensity on the recording layer L2 has a Gaussian distribution along the radial direction of the disk OD as indicated by I1 in FIG. 2. The phases of the incident light beam components having the intensity distribution I1 at the top surface of the recording layer L2 are substantially same.

The incident light beam I1 is reflected by the surface of the recording layer L2 as shown in FIG. 1D. When considering the superposition of the light components WB1 and WB2 at the detecting point P, each of the light components WB1 and WB2 is considered as if it were emitted from a point light source arranged on the surface of the recording layer L2.

When light beam LB1 is irradiated onto a region on land track 1004b where there is no information recorded, some of the light components are reflected by the neighboring land track 1004c. The light components reflected respectively by the modulating region 1006c on the land track and the modulating region in the adjacent groove track are different in phase, and because the phase difference is $\psi$ as stated above, the light components from the two areas interfere destructively with each other at the detection point P.

When the light modulating region 1006c does not extend in the groove track 1003c, the light component reflected from the top of the neighboring track undergoes no interference at the detection point P and the light component serves as a noise. That is, even if there is no light modulating region on the track as shown in FIG. 1D, when the beam is focused on the land track 1004b, the photodetector detects reflected light, thereby reading error may sometimes occur.

Even when the light beam LB1 is irradiated onto a region on the land track 1004b where there is a modulating region 1004b, as shown in FIG. 1E and 2, the light components WB1 and WB2 destructively interfere at the detection point P, and only the subject light component WB3 is detected with the photodetector 35.

Further, because the area of the modulating region 1006c in the groove 1003c is smaller than that of the modulating region 1006c on the land track 1004c, and because the light intensity irradiated on the smaller modulating region 1006c in the groove 1003c is greater than that of the recording region 1006c on the land track 1004c, the intensities of the respective reflected light components are the same at the point P, thereby the reflected light components effectively cancel each other and crosstalk (noise) from the neighboring track 1004c at the detection point P is suppressed and reduced.

Therefore, the interval of the tracks can be greatly decreased regardless of the diameter of the laser beam spot used in the reproduction beam, and the recording density, i.e., the information recording amount per unit area can be increased.

Unfortunately, the intensity of the light component WB3 reflected from the light modulating recording region 1006b on land track 1006b that is at the center of the beam is reduced by the destructive interference from the light components reflected by the modulating region 1006b on the adjacent groove track. However, the center of the light beam is aimed at the center of the recording region 1006b and the intensity of the light reflected by the center is very strong, thus the interference component from that position of the same modulating region that lies in the groove track is not large enough to affect the accuracy of the data reproduced.

When the groove width is greater than the wavelength of the incident light beam, the step height H between the land and groove tracks is ¼ times (or an odd number times ¼) the wavelength of the incident light beam, as stated above. However, according to strict diffraction theory, i.e. according to "L. Pasman et al., Principles of Optical Disc Systems, Chap. 3.3", when the groove width is very small, particularly when it is smaller than the wavelength of the light in the incident beam, the depth of the groove H for which destructive interference occurs is not always an odd number times λ/4. The phase difference ψ is expressed by the following equation (1), when the light beam LB1 is polarized, and the direction of polarization is parallel to the longitudinal direction of the groove.

$$\psi = \left\{ 0.6 \left( \frac{Mg}{\lambda} \right) + 0.3 \right\} \frac{2\pi}{\lambda} 2nH \quad (1)$$

where M is the refractive index of the medium (substrate 1001), g is the width of the groove and H is the depth of the groove. Note that g is smaller than 7λ/6n. The preferable groove depth H is obtained by substituting $\psi=(2n-1)\times\pi$ into eq. (1).

According to the present embodiment, the intensity distribution of the laser spot is assumed to be a Gaussian distribution. However, when the track pitch becomes smaller than λ/NA, interference is effectively achieved, even if the intensity is not distributed with strict Gaussian. Note that NA is the numerical aperture of the objective lens. For example, even if the incident light intensity is distributed as an Airy disk, when the interval between the adjacent land tracks is less than the Airy disk radius r=0.61 λ/NA, the respective wave fronts of the light components irradiated on the light modulating region on the neighboring land track and the light modulating region in the adjacent groove track are flat, light component reflected from these regions are cancelled by destructive interference and the crosstalk is suppressed.

Further, the light modulating region described above is not limited by the amplitude modulation type signal mark which differs in reflection coefficient (reflectance) from the portion surrounding the mark. That is, a magneto-optic mark may be applied to the light modulating region instead. The magneto-optic mark has a different magneto-optic Kerr effect from its surrounding region. Each of the light modulating regions 1006b and 1006c in FIG. 2 may be such a magneto-optic mark. This magneto-optic mark differs in magnetic susceptibility from its surrounding region, and the magneto-optic marks (light modulating regions) are formed in either the groove or the land tracks and arranged such that the magneto-optic marks forms a spiral or a concentric circle.

The magneto-optic mark rotates the polarization direction of the incident light beam. The rotated plane of polarization of the light beam component reflected by the magneto-optic mark on the top surface of the land track corresponds to the rotated plane of polarization of the light beam component reflected by the magneto-optic mark on the bottom surface of the groove track. Thereby if the step height H satisfies the above-stated relationship, the intensities of the respective rotated planes of polarizations destructively interfere with one another, because the phase difference between the light beam components respectively reflected by the top and bottom surfaces is an odd number times π radian. This fact may be clearly understood by considering the transition of each of the polarized light beam components in the reproducing optical system for a magneto-optic disk by using the Jones vector. The subject reproducing optical system is a system which lead each of the polarized light beam components emitted from the light source toward the magneto-optic disk (magneto-optic information recording medium) and led the reflected light components from the optical disk into the photodetector (photo-receiving element). That is, in calculating the light beam transition by using so-called symmetrical differential method, the imaginary part of the Kerr rotational angle θ expressed as a complex number can be ignored, and note that the rotation of the plane of the polarization is caused by the magnetic Kerr effect. The amplitude reflection coefficient of the magneto-optic mark is 1−θ and that of its surrounding region is 1+θ, when the constant term in the coefficient is omitted. Note that when considering the coefficient from another detecting element, the amplitude reflection coefficients of the mark and its surrounding region change their places. Therefore, the above description for the amplitude mark may be applied to the magneto-optic mark.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 286214/1994 (6-286214) filed on Nov. 21, 1994 is hereby incorporated by reference.

What is claimed is:

1. An optical disk, comprising:
   (a) neighboring land tracks, wherein light modulating regions are formed on said land tracks, wherein information is read out by irradiating a light beam onto said land tracks, and wherein the light beam is focused on the light modulating region by a lens; and
   (b) a grove track separating said land tracks, wherein each of the light modulating regions extends into said groove track,
   wherein said optical disk satisfies the following expressions:

$H=(2n-1)\times\lambda/4,$ and $r<0.61\lambda/NA;$ where,
   H is the step height between a top surface of one of said land tracks and a bottom surface of said groove track,
   n is a natural number,
   λ is the wavelength of the light beam,
   r is the interval between said neighboring land tracks, and
   NA is the numerical aperture of the lens.

2. An optical disk according to claim 1, wherein each of the land track has an intensity modulation layer including:
   first and second dielectric protection films;
   a recording layer of GaSbTe; and
   a metal reflection film, wherein both said recording layer and said metal reflection film are sandwiched between said first and second dielectric protection films.

3. An optical disk according to claim 2, wherein said first and second dielectric protection films are comprised of ZnS.

4. An optical disk according to claim 2, wherein said first and second dielectric protection films are comprised of phospho-silicate glass.

5. An optical disk according to claim 2, wherein said first and second dielectric protection films are comprised of SiN.

6. An optical disk according to claim 2, wherein said metal reflection film is comprised of Al.

7. An optical disk according to claim 2, wherein said metal reflection film is comprised of Ni.

8. An optical disk according to claim 2, wherein said metal reflection film is comprised of Au.

9. An optical disk according to claim 1, wherein the wavelength $\lambda$ is larger than 400 nm and small than 900 nm.

10. An optical disk according to claim 1, wherein phase difference $\psi$ between light components reflected respectively by a top surface of one of said land tracks and a bottom surface of said groove track satisfies following equation:

$$\psi=(2n-1)\times\pi,$$

where, n is a natural number.

11. An optical disk comprising first and second track groups which form a hill and valley structure, wherein light modulating regions are formed on one of said track groups, and a width of one of said light modulating region is greater than a width of said track, wherein a light beam is focused on said light modulating regions by a lens, and said optical disk satisfied the following expressions:

$$H=(2n-1)\times\lambda/4,$$

and $$r<0.61\lambda/NA;$$

where,

H is the step height between a top surface of one of said land tracks and a bottom surface of said groove track, n is a natural number, $\lambda$ is the wavelength of the light beam, r is the interval between said neighboring land tracks, and NA is the numerical aperture of the lens.

12. An optical disk according to claim 11, wherein each of said light modulating regions differs in reflectance from its surrounding region.

13. An optical disk according to claim 11, wherein each of said light modulating regions differs in magnetic susceptibility from its surrounding region.

14. A method for reproducing an information from an optical disk having land tracks and a groove track separating said land tracks, said method comprising:

irradiating a light beam onto an light modulating region extending from said land track to said groove track, wherein the light beam is reflected by the light modulating region and the intensity of the light beam is changed by the reflection; and detecting the reflected light beam with a photodetector, wherein the light beam is focused on said light modulating regions by a lens, and said optical disk satisfies the following expressions:

$$H=(2n-1)\times\lambda/4,$$

and $$r<0.61\lambda/NA;$$

where,

H is the step height between a top surface of one of said land tracks and a bottom surface of said groove track, n is a natural number, $\lambda$ is the wavelength of the light beam, r is the interval between said neighboring land tracks, and NA is the numerical aperture of the lens.

* * * * *